United States Patent [19]

Recasens et al.

[11] Patent Number: 5,252,310
[45] Date of Patent: Oct. 12, 1993

[54] REACTIVE DERIVATIVE OF ZIRCONIUM AND ITS PREPARATION

[75] Inventors: Joseph Recasens, Sorgues; Daniel Urffer, Morieres Les Avignon; Pierre Ferlanda, Le Pontet, all of France

[73] Assignee: Societe Europeenne des Produits Refractaires, Courbevoie, France

[21] Appl. No.: 938,523

[22] Filed: Sep. 2, 1992

Related U.S. Application Data

[60] Continuation of Ser. No. 751,579, Aug. 22, 1991, abandoned, which is a division of Ser. No. 324,647, Mar. 17, 1989, abandoned.

[30] Foreign Application Priority Data

Mar. 22, 1989 [FR] France .................. 88 03679

[51] Int. Cl.$^5$ .................. C01B 7/00; C01G 25/02
[52] U.S. Cl. .................. 423/462; 423/608
[58] Field of Search .................. 423/608, 462, 472

[56] References Cited

U.S. PATENT DOCUMENTS

| | | | |
|---|---|---|---|
| 2,837,400 | 6/1958 | Blumenthal | 423/492 |
| 3,254,949 | 6/1966 | Clearfield | 423/608 |
| 3,334,962 | 8/1967 | Clearfield | 423/608 |
| 4,719,091 | 1/1988 | Wusirika | 423/608 |
| 4,746,497 | 5/1988 | Jenkins et al. | 423/85 |
| 4,786,486 | 11/1988 | Giuelen et al. | 423/608 |

FOREIGN PATENT DOCUMENTS

| | | | |
|---|---|---|---|
| 2051299 | 10/1970 | Fed. Rep. of Germany | 423/608 |
| 1685563 | 3/1963 | Japan | 423/608 |
| 0039727 | 3/1984 | Japan | 423/608 |
| 2100615 | 1/1983 | United Kingdom | 502/304 |

OTHER PUBLICATIONS

Inorganic Colloid Chemistry by H. B. Weiser, vol. II (1935) pp. 265-266.
Cotton, et al., Advanced Inorganic Chemistry, 1966, Interscience Pub., pp. 915-916.
Chemical Abstracts, vol. 97, No. 24 (1982), 97:207105m.

*Primary Examiner*—Michael Lewis
*Assistant Examiner*—Steven Bos
*Attorney, Agent, or Firm*—Watson, Cole, Grindle & Watson

[57] ABSTRACT

Reactive derivatives of zirconium, are provided which are in the form of a pulverulent white, non-crystallized solid which is dry in appearance, and consist of metazironic acid, ZrO(OH)$_2$, accompanied by free or weakly bound water, some of the OH$^-$ ions being optionally replaced by halide ions. The ZrO$_2$ content of these derivatives is from 60 to 92% by weight inclusive, the water content ranges from 3 to 40%, and the halide ion content can range up to approximately 5% by weight. The solid derivatives of the invention can be easily converted into usual reactive derivatives of zirconium by reaction with an aqueous solution of an acid.

7 Claims, No Drawings

REACTIVE DERIVATIVE OF ZIRCONIUM AND ITS PREPARATION

CROSS REFERENCE TO RELATED APPLICATIONS

This application is a continuation of application Ser. No. 751,579, filed Aug. 22, 1991, now abandoned, which was a divisional of application Ser. No. 324,647, filed Mar. 17, 1989, now abandoned.

The invention relates to a new reactive derivative of zirconium and to its preparation.

The term "reactive derivative of zirconium" denotes a zirconium compound which is in solution in an aqueous or organic solvent or which can be dissolved in such a solvent. The reactive derivative of zirconium can react in the dissolved state with other compounds.

Many reactive derivatives of zirconium are known. Among these, those most commonly employed in industry are the following:

basic zirconium carbonate ($CO_2/ZrO_2 \simeq 0.5$) containing 40% by weight of ZrO in the form of moist paste, zirconium orthosulphate (sulphate/$ZrO_2 \simeq 2$) either in the form of aqueous solution (containing 18% by weight of $ZrO_2$), or in the form of crystallized solid (containing 32% by weight of $ZrO_2$), zirconium oxychloride (chloride/ZrO 2) either in the form of aqueous solution (containing 20% by weight of $ZrO2$) or in the form of crystallized solid (containing 33% by weight of $ZrO_2$), basic zirconium sulphate (sulphate/$ZrO_2 \simeq 0.6$ to 1) in the form of moist paste (containing 37% by weight of $ZrO_2$), zirconium nitrate in the form of aqueous solution (containing 19% by weight of $ZrO_2$) or of solid (containing 40% by weight of $ZrO_2$), zirconium acetate in solution (containing 22% by weight of $ZrO_2$), zirconium hydroxide (containing 42% by weight of $ZrO_2$), and zirconium ammonium carbonate in solution (containing 13% by weight of $ZrO_2$).

Many organic derivatives of zirconium are also known (propionate, lactate, acetylacetonate, various alcoholates), whose $ZrO_2$ content ranges from 6 to 15% by weight.

These materials are employed as such (in the case of derivatives in solution) or must be dissolved by reaction with a solution, generally acidic, by the final user (in the case of derivatives which are solid or in paste form).

In practice, only the zirconium present in the abovementioned materials is generally utilized, and not the anions (for example chloride, carbonate, sulphate, nitrate or acetate) and/or the water, even though they form the greater part of these materials, their role being essentially to keep the zirconium in a soluble form. The anions and/or the water do not directly participate in the reactions involved in the practical applications of these materials and are, in fact, rather detrimental. In fact, solutions of zirconium compounds are corrosive and toxic, and this presents problems in storage and in transport, and pastes based on zirconium compounds are heterogeneous because of the presence of free water and are difficult to handle. Furthermore, certain anions (particularly sulphates and chlorides) or water can oppose the required reactions, for example during the production of driers of the zirconium soap type. Finally, from an economic standpoint, it is not very advantageous to transport materials containing relatively little active material ($ZrO_2$) and to have to employ costly containers capable of resisting corrosion, in the case of materials in the form of solutions or of pastes.

It is therefore advantageous to be able to have available reactive derivatives of zirconium with a high $ZrO_2$ content, which are solid materials containing a minimum of impurities and of water.

The objective of the invention is to provide such reactive derivatives of zirconium.

More particularly, the invention relates to reactive derivatives of zirconium, characterized in that they are in the form of a pulverulent white solid which is not crystallized and dry in appearance, soluble in an aqueous solution of an acid, and consist of metazironic acid $ZrO(OH)_2$ accompanied by free or weakly bound water, it being possible for some of the $OH^-$ ions to be replaced by halide ions, the $ZrO_2$ content of these derivatives being from 60 to 92% by weight inclusive, preferably from 75 to 86.5% by weight, and the water content of these derivatives ranging from 3 to 40%, preferably 13 to 25%, and the halide ion content of these derivatives being capable of ranging up to approximately 5%.

The derivatives of the invention usually contain traces of halide ions originating from impurities present in the raw materials. However, in the present description it is considered that the derivatives of the invention are free from halides when their halogen content is below 0.02% by weight within analytical accuracy. A class of preferred derivatives is that of the derivatives containing, on a weight basis, 75 to 86.5% of $ZrO_2$, 13 to 25% of water and not more than approximately 0.5% of halide ions, in particular $Cl^-$ ions. Another class of preferred derivatives is that of the derivatives containing, on a weight basis, less than 13% of water and more than 0.5% of halide ions, in particular $Cl^-$ ions.

The invention also relates to a process for the preparation of the abovementioned reactive derivatives of zirconium, characterized in that it comprises the steps consisting in:

(a) preparing water-rich zirconia hydrate $ZrO_2 \cdot 2H_2O$ or zirconium hydroxide $Zr(OH)_4$, (b) optionally, replacing some of the $OH^-$ ions in the product of step (a) with halide ions, and (c) partially dehydrating, in a controlled manner, the product of step (a) or (b) by heating to a temperature of not more than 1300° C. until a pulverulent white solid is obtained, which is not crystallized and dry in appearance and soluble in an aqueous solution of an acid.

The first step (a) consists in preparing water-rich zirconia hydrate $ZrO_2 \cdot 2H_2O$, also called zirconium hydroxide $Zr(OH)_4$. "Water-rich" means a product containing at least 45% by weight of water in total (free water + bound water). This step may be performed in various ways, such as, for example:

Neutralization of an acidic aqueous solution of a Zr salt (for example the oxychloride, nitrate or acetate), with a base (for example sodium hydroxide, aqueous ammonia), followed by filtration and washing of the filter cake. A bulky and water-rich (90% and more) precipitate of zirconia hydrate or zirconium hydroxide is thus obtained.

This method offers the advantage of providing a pure product freed from the impurities which may be present in the starting salt.

Hydrolysis of an organic zirconium salt in solution in water or a water-alcohol mixture, followed by filtration and washing of the filter cake. However, this method is not advantageous from an economic standpoint, because an organic Zr salt must be available.

Displacement of ions from a solid basic Zr salt with a reactant in aqueous solution or water, depending on circumstances, followed by filtration and washings of the filter cake. A "basic" Zr sulphate (reactant: base in aqueous solution) or an alkali metal zirconate such as sodium zirconate (reactant: water) may be employed, for example, as a basic Zr salt. This method is the preferred method from the point of view of cost. It also makes it possible to obtain a reactive derivative of zirconium with a reduced content of free or weakly bound water. It has the possible disadvantage of leaving fairly high residual contents of sulphates in the final product, (in the case of a basic Zr sulphate) or of alkali metal oxides (in the case of an alkali metal zirconate). However, when the optional step (b) is used, the alkali metal oxides are found to be practically eliminated.

The optional step (b) of partial substitution of the $OH^-$ ions in the product of step (a) by halide ions makes it possible to obtain reactive derivatives of zirconium with higher $ZrO_2$ contents. This step, which is used when a halide ion content above 0.02% is desired, may be conducted by washing the product of step (a) with an aqueous solution of the corresponding hydrohalogenic acid. In the case of washing with hydrochloric acid which is intended to substitute $Cl^-$ ions for $OH^-$ ions, a $Cl^-$ ion content of the order of 5% by weight can be attained, but the final content can be adjusted by carrying out a second washing with the aid of aqueous ammonia, for example. In the case where the product of step (a) has been obtained by displacement of ions from an alkali metal zirconate, such as Na zirconate, the substitution of $OH^-$ ions by halide ions, for example $Cl^-$, can be carried out by washing the product of step (a) with an aqueous solution of ammonium halide, for example ammonium chloride, optionally acidified with hydrochloric acid. The residual sodium is thus displaced with a controllable quantity of Cl by adjusting the pH of the washing solution. A subsequent washing with another acid allows the corresponding anions to be fixed, even if the latter do not contribute to the stability (in the case of washing with $HNO_3$ in example 5).

The controlled dehydration step (c) may also be performed in various ways. This dehydration may be carried out merely by heating the product of step (a) or (b) in an oven at a temperature not exceeding 120° C. in the case of a nonhalogenated product and not exceeding 1300° C. in the case of a halogenated product (that is to say one in which halide ions have been substituted for some of the $OH^-$ ions), in the case of a relative atmospheric humidity of 50 to 70%. The dehydration begins already at 300° C. but is slow at this temperature. The operation will be preferably carried out between 80° and 1100° C. The degree of dehydration obtained will obviously vary with the temperature employed and the degree of heating. The dehydration can also be performed by heating using microwaves. This heating method is highly effective and rapid. An excessively severe heating, which would result in the decomposition of $ZrO(OH)_2$ with production of insoluble zirconia (that is to say of crystallized zirconia) and water, must be avoided in any case.

The reactive derivatives of zirconium of the invention can be easily converted into the usual reactive derivatives of zirconium. It suffices to dissolve the derivatives of the invention in an aqueous solution of an acid, for example of hydrochloric acid to obtain zirconium oxychloride, of nitric acid to obtain zirconium nitrate, and so on. The high solubility of the derivatives of the invention can be attributed to the presence of zirconyl ions $ZrO^{2+}$.

The reactive derivatives of zirconium of the invention are remarkably stable. After a period of 15 days at 800° C., their solubility in a hydrochloric acid solution remains higher than 95%, whereas it is then only 50% in the case of basic zirconium carbonate.

Depending on their purity, the derivatives of the invention can be employed as a source of Zr in various industrial applications. By way of indication, there may be mentioned:

the treatment of $TiO_2$-based pigments, the derivative of the invention being dissolved in situ in a hydrochloric or sulphuric medium, the treatment of petroleum formations, it being possible for the derivative of the invention to be dissolved on site in hydrochloric acid.

The following examples, which do not imply any limitation, are given for illustrating the invention.

EXAMPLE 1

55 parts by weight of zirconia (natural oxide known as baddeleyite or thermal oxide) with an average particle of 0.6 to 15 μm are mixed with 45 parts by weight of NAOH in the form of solid pellets or of concentrated aqueous solution. The mixture is heated to 850° C. for 1 hour to obtain, after cooling, a solid mixture of sodium zirconate and excess sodium hydroxide. This mixture is brought into contact with water at 600° C., with stirring (water/mixture weight ratio: 2.5/1). The suspension obtained is filtered and the filtration residue is then washed in a stream of water (water/product weight ratio: 20/1). The product obtained is washed with a 0.1N aqueous solution of HCl (solution/product weight ratio: 30/1), and then with water (water/product weight ratio: 5/1). The moist paste obtained is then dehydrated for 24 hours at 400° C. at 50-70% relative humidity. The pulverulent solid product finally obtained contains, on a weight basis, approximately 75% of $ZrO_2$, 20% of $H_2O$, 5% of $Cl^-$ and less than 0.5% of various impurities.

EXAMPLE 2

The operating procedure of example 1 is repeated as far as the first washing of the filtration residue with water, inclusive. The product obtained is then washed with a concentrated (100 g/l) solution of ammonium chloride ($NH_4Cl$ solution/product weight ratio: 3/1) and then with water (water/product weight ratio: 5/1). The resulting product is then dehydrated by heating to 800° C. for 6 hours at 50-70% relative humidity. The pulverulent solid product finally obtained contains, on a weight basis, 84% of $ZrO_2$, 15% of $H_2O$, 0.5% of $Cl^-$ and approximately 0.5% of impurities (mainly $Na_2O$).

EXAMPLE 3

The operating procedure of example 1 is repeated as far as the first washing of the filtration residue with water, inclusive. The product is then dehydrated at 800° C. for 12 hours at 50-70% relative humidity. The pulverulent solid product finally obtained contains, on a weight basis, 82% of $ZrO_2$, 13.% of $H_2O$ and 5% of $Cl^-$ and less than 0.5% of impurities (mainly $Na_2O$).

EXAMPLE 4

1 kg of basic zirconium sulphate, obtained as described by F. Farnworth, S. L. Jones, I. McAlpine, "The production, properties and use of zirconium chemicals", Special Publication of the Royal Soc. of Chemistry, No. 40, p. 259 (1981), is suspended in 9 litres of 0.1N aqueous ammonia solution. The pH of the mixture obtained is approximately 7. After stirring at 250° C. the product is filtered and the filter cake is washed with 5 litres of water. The product obtained is then dried at 800° C. for 12 hours at 50-70% relative humidity. The solid product finally obtained contains, on a weight basis, 82% of $ZrO_2$, 13% of $H_2O$ and 5% of impurities (mainly sulphate ions). It should be noted that the aqueous ammonia could be replaced with another base.

EXAMPLE 5

The operating procedure of example 1 is repeated as far as the first washing of the filtration residue with water, inclusive. The product obtained is washed with a 0.1N aqueous solution of nitric acid (acid solution/product weight ratio: 30/1). The product is then dehydrated at 800° C. for 12 hours at 50-7.0% relative humidity. The pulverulent solid product finally obtained contains, on a weight basis, 82% of $ZrO_2$, 13% of $H_2O$ and 5% of impurities (mainly nitrate ions).

EXAMPLE 6

The operating procedure of example 1 is repeated as far as the washing with hydrochloric acid, inclusive. The product is then dehydrated at 1200° C. for 12 hours at 50-70% relative humidity. The pulverulent solid product finally obtained contains, on a weight basis, approximately 92% of $ZrO_2$, 3% of $H_2O$, 5% of $Cl^-$ and less than 0.5% of impurities.

EXAMPLE 7

Preparation of a Zirconium Oxychloride Solution Containing 20% of $ZrO_2$

The product of example 2 is added to a 37% strength aqueous solution of hydrochloric acid in such quantities that the molar ratio $Cl/ZrO_2$ is equal to approximately 2; the whole is heated to 1000° C. for 30 minutes and water is then added to adjust the relative density of the resulting solution to 1.37, and the latter is then cooled to ambient temperature.

EXAMPLE 8

Preparation of a Zirconium Nitrate Solution Containing 20% of $ZrO_2$

The product of example 2 is added to a 65 % strength aqueous solution of nitric acid in such quantities that the molar ratio $NO_3/ArO_2$ is equal to approximately 2 and that the proportion of $ZrO_2$ is approximately 20% by weight. The whole is heated to 800° C. for 1 hour and is then cooled to ambient temperature.

It is self-evident that the embodiments described are merely examples and that they could be modified, particularly by the substitution of technical equivalents, without thereby departing from the scope of the invention.

What is claimed is:

1. A process for preparing a halogen-containing zirconium hydrate in the form of a pulverulent white solid which is not crystallized and is dry in appearance, is soluble in acidic aqueous solutions, and consists of metazironic acid, $ZrO(OH)_2$, accompanied by free or weakly bound water, wherein the $OH^-$ ions have been partially replaced by halide ions, said hydrates containing, by weight, 60-92% of $ZrO_2$, 3-39.98% of water and 0.02-5% of halogen, said process comprising the steps of:
   (a) preparing a product comprising a zirconia hydrate $ZrO_2 \cdot 2H_2O$ or zirconium hydroxide $Zr(OH)_4$ containing at least 45% by weight of free water plus bound water,
   (b) washing said zirconia hydrate or zirconium hydroxide with an aqueous solution of an ammonium halide to partially substitute halide for $OH^-$ ions in said product, and
   (c) partially dehydrating the product of step (b) by heating to a temperature from 80° to 130° C. to obtain said halogen-containing zirconium hydrate.

2. A process according to claim 1, wherein step (c) is carried out between 80° to 130° C.

3. A process according to claim 1, wherein step (b) is carried out with an aqueous solution ammonium chloride.

4. A process according to claim 1, wherein step (a) comprises reacting basic zirconium sulfate with an aqueous base, separating the resultant precipitate, and washing said precipitate.

5. A process according to claim 1, wherein step (a) comprises reacting an alkali metal zirconate with water, separating the resultant precipitate, and washing said precipitate.

6. A process according to claim 1, wherein step (a) comprises neutralizing an acidic aqueous solution of a zirconium salt with a base, separating the resultant precipitate, and washing said precipitate.

7. A process according to claim 1, wherein step (c) is carried out by a microwave heating.

* * * * *

UNITED STATES PATENT AND TRADEMARK OFFICE
CERTIFICATE OF CORRECTION

PATENT NO. : 5,252,310
DATED : October 12, 1993
INVENTOR(S) : Joseph Recasens et al.

It is certified that error appears in the above-indentified patent and that said Letters Patent is hereby corrected as shown below:

```
Column 2, line 48, replace "1300°C." with --130°C.--
Column 3, line 50, replace "1300°C." with --130°C.--
Column 3, line 56, replace "1100°C." with --110°C.--
Column 4, line  8, replace  "800°C." with  --80°C.--
Column 4, line 29, replace "NAOH"    with --NaOH--
Column 5, line 14, replace  "800°C." with  --80°C.--
Column 5, line 30, replace  "800°C." with  --80°C.--
Column 5, line 39, replace "1200°C." with --120°C.--
Column 6, line  8, replace "NO₃/ArO₂" with --NO₃/ZrO₂--
Column 6, line 10, replace  "800°C." with  --80°C.--
```

Signed and Sealed this

Thirteenth Day of September, 1994

BRUCE LEHMAN

*Attest:*

*Attesting Officer*  *Commissioner of Patents and Trademarks*